June 25, 1963 A. C. B. BROWN 3,094,950
PALLETS
Filed Feb. 1, 1961 2 Sheets-Sheet 1
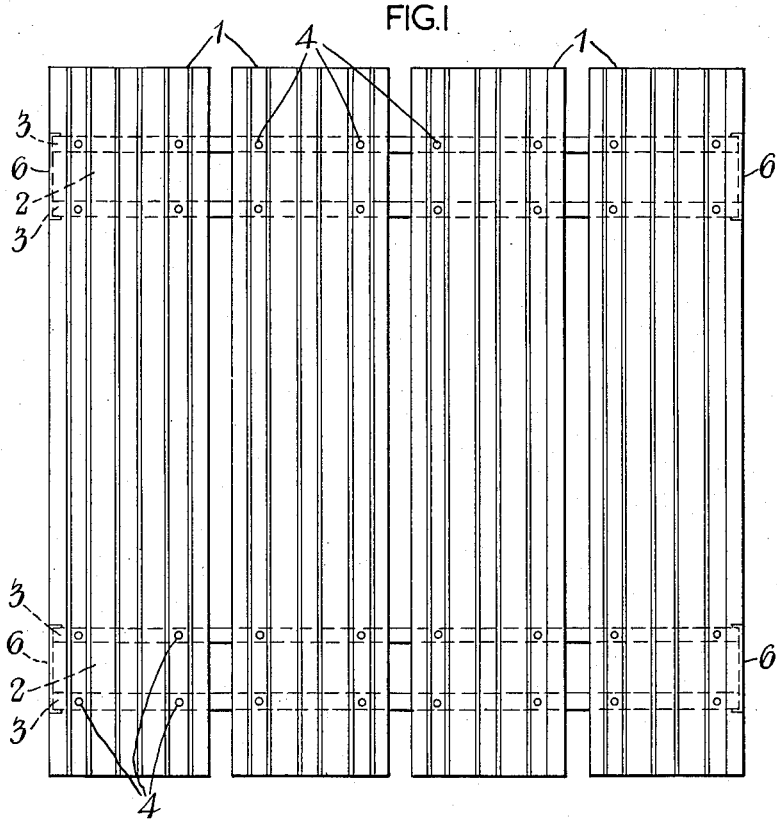
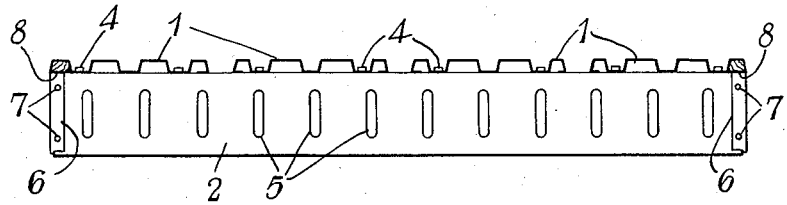
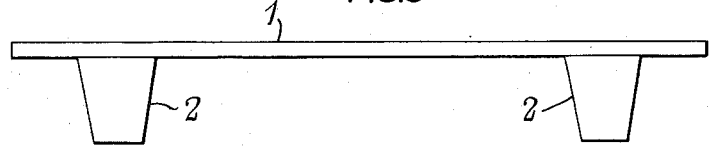
Inventor
Antony C. B. Brown
by Sommers & Young
Attorneys

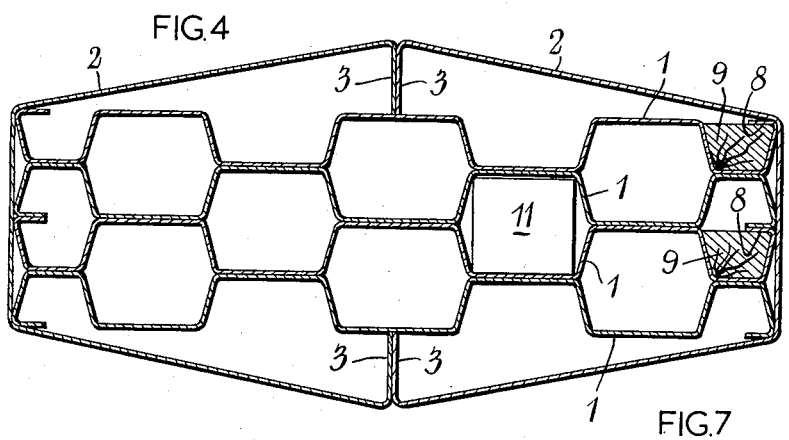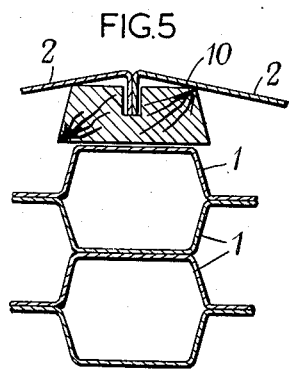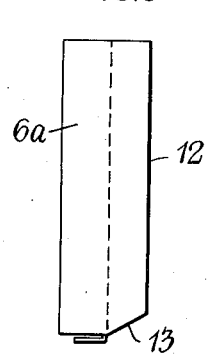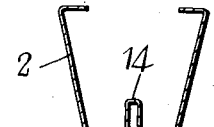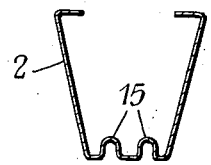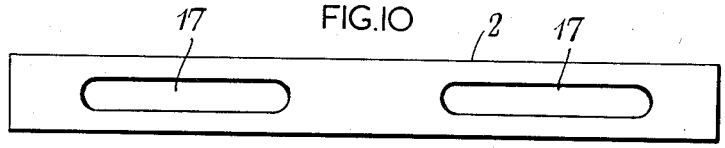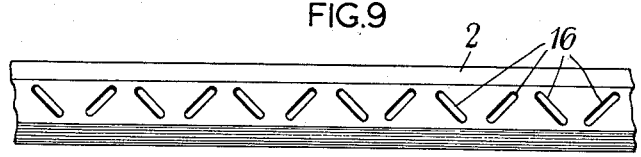

United States Patent Office 3,094,950
Patented June 25, 1963

3,094,950
PALLETS
Antony Charles Barrington Brown, King's Langley, England, assignor to Dexion Limited, London, England
Filed Feb. 1, 1961, Ser. No. 86,430
Claims priority, application Great Britain Feb. 2, 1960
7 Claims. (Cl. 108—56)

This invention relates to pallets and has for object to provide a metal pallet which is cheap to produce and can easily be assembled or disassembled by unskilled labour.

According to the invention, a pallet comprises a plurality of elongated corrugated metal boards arranged side by side to form the load-bearing surface of the pallet and bolted to a plurality of metal channel-section bearers which extend transversely of the boards and which have longitudinal flanges along their open sides, the width of the boards being not more than twice the depth of the bearers, so that, when the pallet is dismantled, the two bearers can be secured together with their open sides facing one another, to form a container for the boards.

Preferably the depth of the corrugations of the boards multiplied by the number of the boards is equal to the width of the narrowest part of the bearers, so that, when the pallet is dismantled, the boards fit snugly within the container formed by the bearers.

With such a pallet the boards can be stowed inside the container formed in the bearer, making a compact package for storage, handling or transport. The flanges on the bearers are preferably turned inwards, so that the package has no inconvenient projections.

In the assembled pallet the channel-section bearers are preferably disposed with their open sides facing the boards, the bolts being passed through holes in the flanges on the bearers and through corresponding holes in the valleys of the corrugated boards. With this arrangement the bolts are prevented from damaging loads carried on the pallet, and vice versa, since the bolt heads are accommodated in tne valleys of the corrugations.

Various embodiments of the invention will now be described in more detail by way of example and with reference to the accompanying drawings, in which:

FIGURE 1 is a plan view of a pallet.
FIGURE 2 a side view,
FIGURE 3 an end view,
FIGURE 4 a section through a dismantled and packaged pallet,
FIGURE 5 a part-section of a modified pallet in the packaged condition,
FIGURE 6 an elevation of a modified bearer end cap,
FIGURE 7 a section through a modified form of bearer,
FIGURE 8 a section through another form of bearer,
FIGURE 9 a bottom plan view of yet another form of bearer, and
FIGURE 10 an elevation of still another form of bearer.

In the embodiment shown in FIGURES 1 to 3, the pallet comprises four elongated corrugated boards 1 of sheet metal, forming its load-bearing surface. These boards are secured together side by side by being bolted to a pair of transversely disposed channel-section bearers 2, also of sheet metal. The metal may be of any desired thickness, but is conveniently about 0.040" thick. It may be sheet steel or a light alloy. The bearers have longitudinal flanges 3 along their open sides which face the boards 1, and mating holes are provided in the flanges 3 and in the valleys of the corrugated boards 1, to receive the securing bolts 4. The heads of the bolts 4 thus lie in the valleys and are prevented from damaging loads placed on the pallet, and vice versa.

The walls of each bearer 2 are provided with indentations 5 to resist bowing under load. The ends of the bearer 2 are provided with flanged end caps or cover plates 6 giving additional rigidity. The end caps 6 may be made detachable but are preferably secured by pop rivets 7 which secure the side flanges of the end caps 6 to the outside of the walls of the bearers 2. The bottom flanges of the end caps, however, lie inside the bearers, to give a smooth under surface to the latter. The flanges 3 along the side walls of the bearer 2 may be turned either outwardly or inwardly with respect to the channel-section. If they are turned inwards, as shown, they may be fitted with nuts (not shown) permanently or temporarily attached (e.g. clipped) below the bolt holes, to facilitate assembly of the pallet. In the embodiment shown, the bearers 2 are spaced inwardly from the sides of the pallet so as to form a wing pallet, e.g. for use with slings. To protect the ends of the boards, channel-section strips (not shown) may be provided, each of which runs the length of one side of the pallet and is secured over one end of each of the four boards. The bearer 2 may alternatively be secured at the ends of the boards 1, so that the outer wall of each bearer lies flush with the respective end of the boards and protects it from damage.

At each side of the boards 1, horizontal inwardly-turned flanges 8 are provided parallel to the corrugations. At each end of the pallet, the flanges 8 each enclose a strip of wood 9 within the outermost corrugation, to protect this corrugation against crushing forces.

The width of the boards 1 may conveniently be 9", which enables the commonly used pallet sizes (32", 36", 40", 48") to be made up satisfactorily, with the gaps between the boards being not more than 2½", which is the maximum generally acceptable. The depth of the channel-section bearers 2 is then preferably 4" to 5".

In any case, the width of the boards 1 should be not more than twice the depth of the bearers 2. Then, when the pallet is dismantled, the bearers 2 can be secured together, as shown in FIGURE 4, with their open sides facing one another, to form a container for the boards, closed at both ends by the end caps or cover plates 6. Where the bearers have outwardly-turned flanges, they may be secured together simply by bolts passing through the mating flanges. To avoid inconvenient projections, however, it is preferred to use inwardly-turned flanges 3 as shown. The bearers 2 may be secured together by strapping (not shown). Alternatively, as shown in FIGURE 5, if the end caps 6 are detachable, the bearers 2 may be secured together by the wooden strips 9 which in this case are provided with longitudinal slots 10. The corrugations of the boards 1 preferably have a depth equal to one quarter of the width of the bottom of the bearers 2. The four boards then fit snugly inside the container formed by the bearers 2, as shown, making a strong and compact package for storage, handling or transport. The package is reinforced internally at the corners and in the centre by the boards 1. A box of nuts and bolts may be included as at 11 to complete the package.

In certain circumstances it may be desirable to transport the assembled pallets by running them over small conveyor rollers. For such use, it is advantageous to provide the bearers with chamfered end caps 6a as shown in FIGURE 6. The outer wall 12 of the end cap 6a is spaced outwardly from the end of the bearer, and the lower part 13 of the wall 12 is inclined at an angle of say 60° to the vertical to give the required chamfer. The chamfer enables the pallet to ride more easily over the roller with which it first comes in contact, or over a join between two sections of conveyor set at an angle to one another. In the packaged condition, the space above the chamfered part 13 of the wall 12 may be used to accommodate the box of nuts and bolts, which may be built in as a permanent fixture.

To reinforce the base of the bearers 2, the base may be folded as shown in FIGURE 7 to give a beam 14 running the whole length of the bearer. Alternatively, as shown in FIGURE 8, the base may be formed with a pair of longitudinal corrugations 15. As a further alternative, FIGURE 9 shows a bottom plan view of a bearer 2 in which the base is formed with a series of indentations 16 at 45° to the length of the bearer.

To adapt the pallet to run on the wheels of a conveyorized racking system, the base of the bearers 2 may alternatively be given an inverted V-section.

For use with a conventional fork-lift truck, the pallet is a two-entry one. As shown in FIGURE 10, however, elongated holes 17 may be punched in the walls of each bearer 2 to make a 4-entry pallet. The holes 17 should preferably have inwardly-turned flanges (not shown) to increase the strength of the bearers.

The pallets can readily be assembled by unskilled labour, spanners being the only tools required. Damaged parts can easily be replaced, or parts from severely damaged pallets can be salvaged and recombined to form new pallets. Several sizes of pallet can be made up from standard parts.

I claim:

1. A pallet comprising a plurality of elongated metal boards arranged side by side to form the load-bearing surface of the pallet and detachably secured to a pair of metal channel-section bearers which extend transversely of the boards from one end of the pallet to the other, said channel-section bearers having longitudinal flanges along their open sides, the width of said boards being not more than twice the depth of said channel-section bearers, and the depth of said boards multiplied by the number of said boards being not more than the width of the narrowest part of said channel-section bearers, so that when the pallet is dismantled, said channel-section bearers can be secured together with their open sides facing one another, and said boards can be stowed inside the container thus formed.

2. A pallet according to claim 1, wherein the said boards are corrugated and the depth of the corrugations, multiplied by the number of said boards is equal to the width of the narrowest part of said channel-section bearers, so that when the pallet is dismantled, and said channel-section bearers are secured together with their open sides facing one another, said boards can be fitted snugly within the container thus formed.

3. A pallet according to claim 1, wherein said flanges on said channel-section bearers are turned inwardly with respect to the channel-section and are provided with nuts attached to said flanges below bolt holes passing therethrough, said nuts receiving bolts passed through corresponding holes in said boards.

4. A pallet according to claim 1, wherein the ends of the said channel-section bearers are provided with flanged end caps.

5. A pallet according to claim 4, wherein the end caps are chamfered at their lower ends.

6. A pallet comprising a plurality of elongated corrugated metal boards arranged side by side to form the load-bearing surface of the pallet, and a pair of metal channel-section bearers extending transversely of said boards from end to end of the pallet with their open sides facing the underside of said boards, said channel-section bearers having longitudinal flanges along their open sides, bolts securing said boards to said bearers being passed through corresponding holes in said flanges and in the valleys of the corrugations of said boards, the width of said boards being not more than twice the depth of said channel-section bearers, and the depth of said corrugations multiplied by the number of said boards being equal to the width of the narrowest part of said channel-section bearers, so that when the pallet is dismantled and said channel-section bearers are secured together with their open sides facing one another, said boards can be fitted snugly within the container thus formed.

7. A pallet comprising a plurality of elongated metal boards arranged side by side to form the load-bearing surface of the pallet and detachably secured to a pair of metal channel-section bearers which extend transversely of said boards from end to end of the pallet, said channel-section bearers having longitudinal flanges along their open sides, the width of said borads being not more than twice the depth of said channel-section bearers, and the total depth of said boards, when dismantled from said channel-section bearers and stacked upon one another, being not more than the width of the narrowest part of said channel-section bearers, so that said boards can be stowed within a container formed by securing said channel-section bearers together with their open sides facing one another.

References Cited in the file of this patent
UNITED STATES PATENTS

| | | |
|---|---|---|
| 1,542,783 | Bilger | June 16, 1925 |
| 1,797,874 | Millray | Mar. 24, 1931 |
| 2,503,562 | Porter | Apr. 11, 1950 |
| 2,668,681 | Kappen | Feb. 9, 1954 |